(12) United States Patent
Oslizlo et al.

(10) Patent No.: US 8,997,304 B2
(45) Date of Patent: Apr. 7, 2015

(54) WINDSCREEN WIPER DEVICE

(71) Applicant: Federal-Mogul Corporation, Southfield, MI (US)

(72) Inventors: Michael Oslizlo, Milan, MI (US); Dennis E. Cox, Belleville, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/714,987

(22) Filed: Dec. 14, 2012

(65) Prior Publication Data

US 2013/0152326 A1    Jun. 20, 2013

Related U.S. Application Data

(60) Provisional application No. 61/570,559, filed on Dec. 14, 2011.

(51) Int. Cl.
*B60S 1/40* (2006.01)
*B60S 1/38* (2006.01)

(52) U.S. Cl.
CPC .............. *B60S 1/4038* (2013.01); *B60S 1/3856* (2013.01); *B60S 1/3858* (2013.01); *B60S 1/387* (2013.01); *B60S 1/4009* (2013.01); *B60S 2001/4054* (2013.01)

(58) Field of Classification Search
CPC ...... B60S 1/387; B60S 1/4038; B60S 1/4003; B60S 1/3851; B60S 1/3858; B60S 1/3849; B60S 1/3856
USPC ............. 15/250.32, 250.43, 250.44, 250.201, 15/250.361
See application file for complete search history.

(56) References Cited

U.S. PATENT DOCUMENTS

| | | | |
|---|---|---|---|
| 4,069,539 A | 1/1978 | Klingberg | |
| 6,434,780 B1 | 8/2002 | Kotlarski | |
| 7,832,047 B2 | 11/2010 | Herinckx | |
| 7,891,044 B2 | 2/2011 | Fink et al. | |
| 7,937,798 B2 | 5/2011 | Fink et al. | |
| 2006/0021178 A1* | 2/2006 | Verelst et al. | 15/250.32 |
| 2008/0289133 A1* | 11/2008 | Kim | 15/250.32 |
| 2010/0236008 A1 | 9/2010 | Yang et al. | |
| 2011/0056042 A1 | 3/2011 | Fink et al. | |

FOREIGN PATENT DOCUMENTS

| | | |
|---|---|---|
| DE | 3709915 A1 | 10/1988 |
| DE | 10326266 A1 | 1/2004 |
| DE | 10320930 A1 | 11/2004 |

(Continued)

OTHER PUBLICATIONS

International Search Report mailed Mar. 25, 2013 (PCT/US2012/069668).

*Primary Examiner* — Gary Graham
(74) *Attorney, Agent, or Firm* — Robert L. Stearns; Dickinson Wright, PLLC

(57) ABSTRACT

A windscreen wiper device for cleaning a windshield of a vehicle is provided. The windscreen wiper device includes a longitudinally extending wiper strip and at least one carrier element in engagement with the wiper strip for operatively supporting and biasing the wiper strip into a predetermined configuration. A base is non-removably coupled to the at least one carrier element and has an opening that extends therethrough to provide access to the at least one carrier element through the base. A connection device is removably secured directly to the at least one carrier element through the opening of the base for attachment with a wiper arm.

8 Claims, 7 Drawing Sheets

(56) References Cited

FOREIGN PATENT DOCUMENTS

| | | | |
|---|---|---|---|
| DE | 102009045672 A1 | | 4/2011 |
| DE | 102009046776 A1 | * | 5/2011 |
| EP | 0267010 A2 | | 11/1987 |
| EP | 1995130 A2 | | 11/2008 |
| WO | 02053421 A1 | | 7/2002 |
| WO | 03084790 A1 | | 10/2003 |
| WO | 2008036894 A2 | | 3/2008 |

* cited by examiner

WINDSCREEN WIPER DEVICE

CROSS REFERENCE TO RELATED APPLICATION

This application claims the benefit of application Ser. No. 61/570,559, filed Dec. 14, 2011, the entire contents of which is hereby incorporated by reference.

BACKGROUND OF THE INVENTION

1. Field of the Invention

The present invention is related to windscreen wiper devices, or wiper blades, and more precisely to connector assemblies for attaching aftermarket wiper blade assemblies to different types of wiper arms.

2. Related Art

Typical aftermarket wiper blades are sold as expendable articles with a connector assembly which can only be attached to a single type of wiper arm. However, when in the store, customers may not always know which type of wiper arms is on their vehicles, and often, they mistakenly purchase the incorrect wiper blade. To make it easier for consumers, some aftermarket wiper blade manufacturers have begun selling wiper blades with connector assemblies which can be re-configured so that a single wiper blade assembly may be attached to virtually any type of wiper arm.

SUMMARY OF THE INVENTION

The subject invention is an improved windscreen wiper device, or wiper blade assembly, which may be quickly and easily configured for attachment to different types of wiper arms. The wiper blade assembly includes a longitudinally extending wiper strip and at least one carrier element in engagement with the wiper strip for operatively supporting and biasing the wiper strip into a predetermined configuration. A base is non-removably coupled to the at least one carrier element and has an opening extending therethrough to provide access to the at least one carrier element through the base. A connection device is removably secured directly to the at least one carrier element through the opening of the base for attachment with a wiper arm. The wiper blade assembly includes various types of connector bodies and adapters which are designed for attachment to different types of wiper arms. Therefore, the customer may purchase the wiper blade assembly without knowing which type of wiper arm is on his or her vehicle. When the customer is ready to install the wiper blade assembly, he or she simply attaches the correct connection device to the wiper blade without the need for any special tools or equipment. If the customer mistakenly attaches the incorrect connector body and adapter, he or she can quickly remove these components and attach the correct ones, also without the need for special tools or equipment.

According to another aspect of the invention, the connection device includes a connector body with a pair of holding elements which deflect outwardly when a portion of the connector body is pinched together to facilitate the installation and removal to/from the at least one carrier element. The connection device also includes a stopper which locks the holding elements in engagement with the at least one carrier element. Thus, the stopper prevents the connector body from accidental disconnection from the at least one carrier element. If the customer wants to attach a different connection device to the at least one carrier element, he or she may still do so by removing the stopper.

According to yet another aspect of the invention, the connector body only engages the carrier elements of the wiper blade assembly rather than the base or any other intermediate structure. Thus, the connection assembly is very low profile when compared to other known connector assemblies. This improves a driver's ability to view the road ahead of the vehicle.

According to still another aspect of the invention, either the connector body or the base presents a tongue and the other presents a slot. One end of the connector body is attached to the connector assembly by sliding the tongue into the slot, and the other end of the connector body is attached directly to the flexors of the wiper blade, i.e. the connector body is secured directly to both the base and the at least one carrier element.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
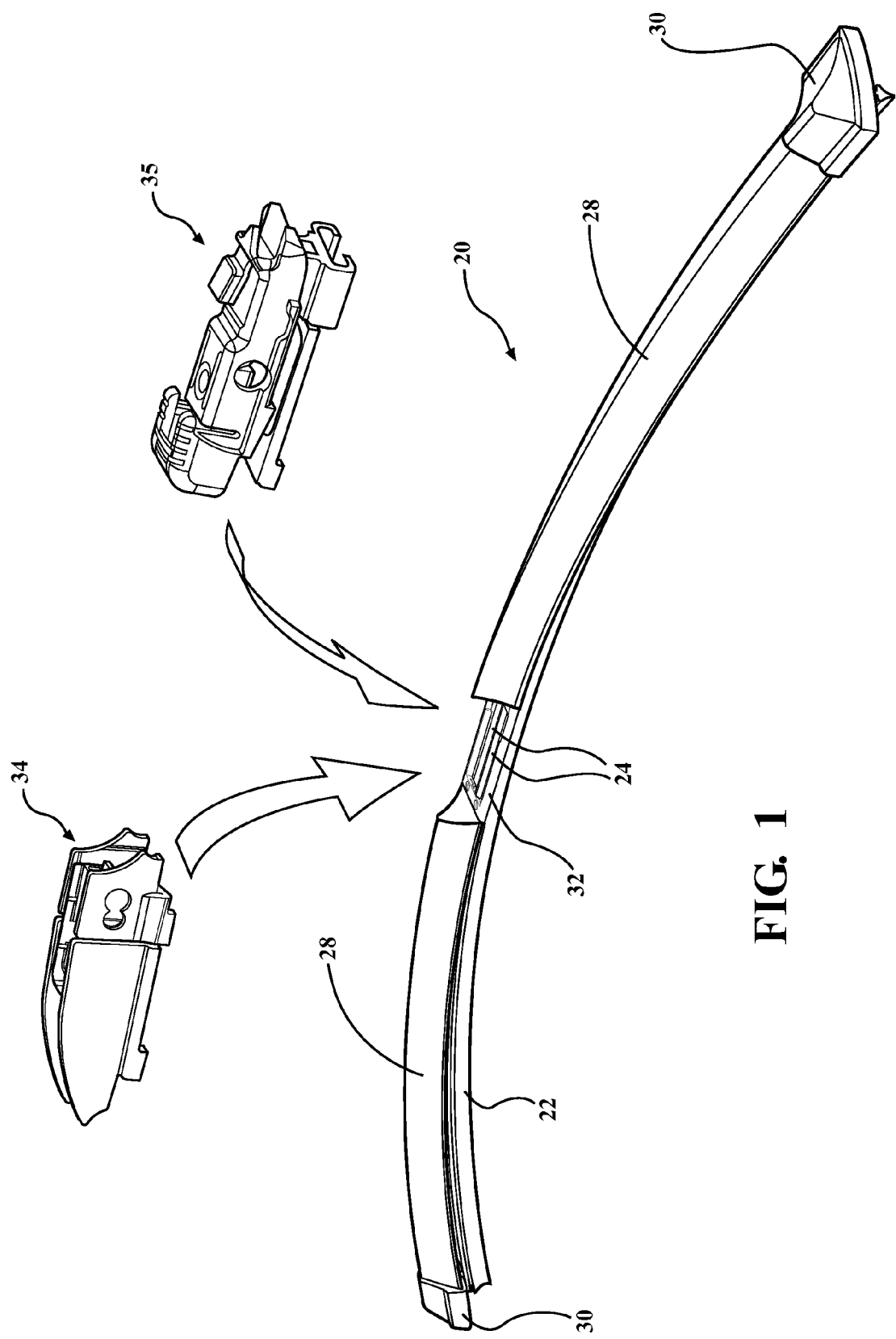
FIG. 1 is a wiper blade assembly constructed according to one exemplary embodiment.

Referring to the Figures, wherein like numerals indicate corresponding parts throughout the several views, a windscreen wiper device, or a wiper blade assembly 20, is generally shown in FIG. 1. The wiper blade assembly 20 includes a longitudinally extending wiper strip 22 of a flexible material, such as rubber, for sealing against a vehicle's windshield (not shown) and for driving rain, snow, ice or other elements away therefrom. The exemplary wiper strip 22 includes a pair of oppositely facing grooves that extend the entire length of the wiper strip 22 and laterally beyond opposite ends of the wiper strip 22. Carrier elements 24 (also known as flexors) are disposed in the grooves and in engagement with the wiper strip 22 to bias the wiper strip 22 into a predetermined configuration. Specifically, the carrier elements 24 are self-biased into a pre-curved shape to bias the wiper strip 22 into a pre-curved configuration which allows the entire length of the wiper strip 22 to be sealed against a curved windshield. A pair of spoiler elements 28 are in engagement with the carrier elements 24 and extend lengthwise to create a down force when the vehicle is travelling at speed to improve the seal between the wiper strip 22 and the windshield. End caps 30 are secured to opposite ends of the carrier elements 24 to interconnect the carrier elements 24. A base 32 is secured to approximate midpoints of the carrier elements 24 between the spoiler elements 28, and the base 32 includes an opening which provides access to the carrier elements 24.

Figure 2:
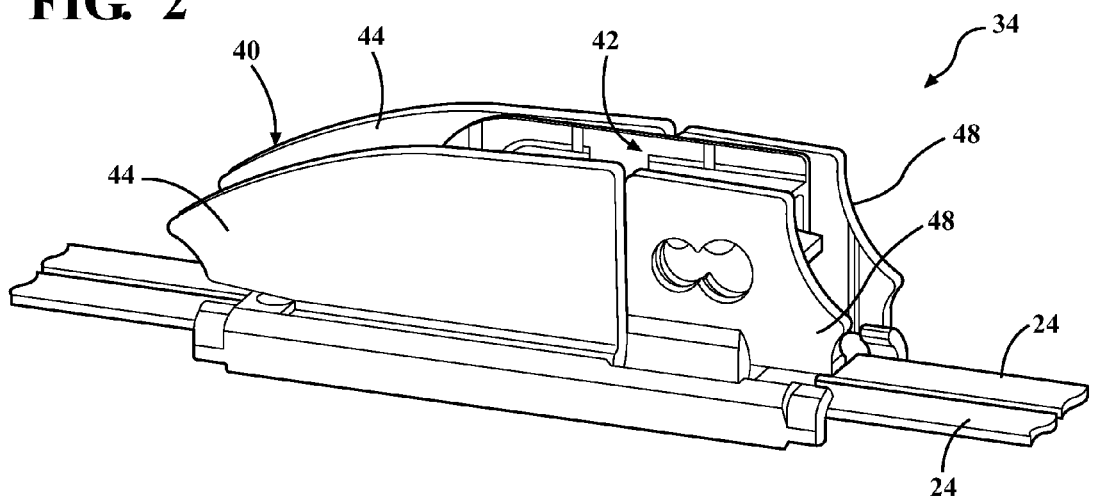
FIG. 2 is a fragmentary and perspective view showing a first connection device secured with a pair of carrier elements.
Figure 3:
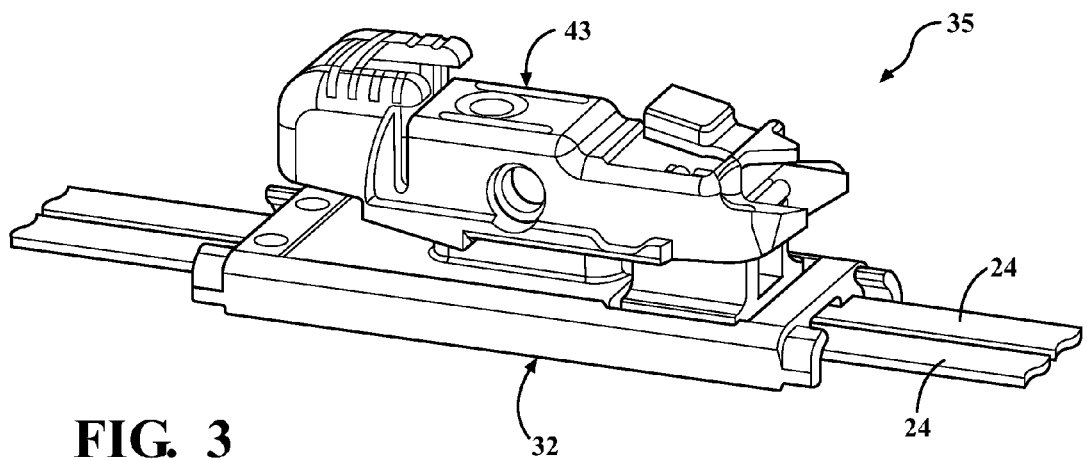
FIG. 3 is a fragmentary and perspective view showing a second connection device secured with the pair of carrier elements.

The exemplary wiper blade assembly 20 includes two connection devices 34, 35 that are configured for attachment with different types or styles of oscillating wiper arms. Specifically, a first connection devices 34 is configured for attachment to hook and pin-style wiper arms (not shown) and a second connection device 35 is configured for attachment to bayonet or top lock-style wiper arms (not shown). The connection devices 34 are also configured to be quickly and easily secured to or removed from the carrier elements 24 with no special tools or expensive equipment. For example, FIG. 2 shows the first connection device 34 secured to the carrier elements 24, and FIG. 3 shows the second connection device 35 secured to the carrier elements 24. It should be appreciated that the wiper blade assembly 20 could include any desirable number of connection devices 34, 35 for mating with any desirably type of wiper arm. A person may quickly secure whichever connection device 34, 35 is configured for attachment to his or her vehicle's oscillating wiper arm onto the carrier elements 24. If the person has mistakenly secured the incorrect connector device to the carrier elements 24, then he or she may easily remove it and secure the correct connection device 34 in its place.

Figure 4:
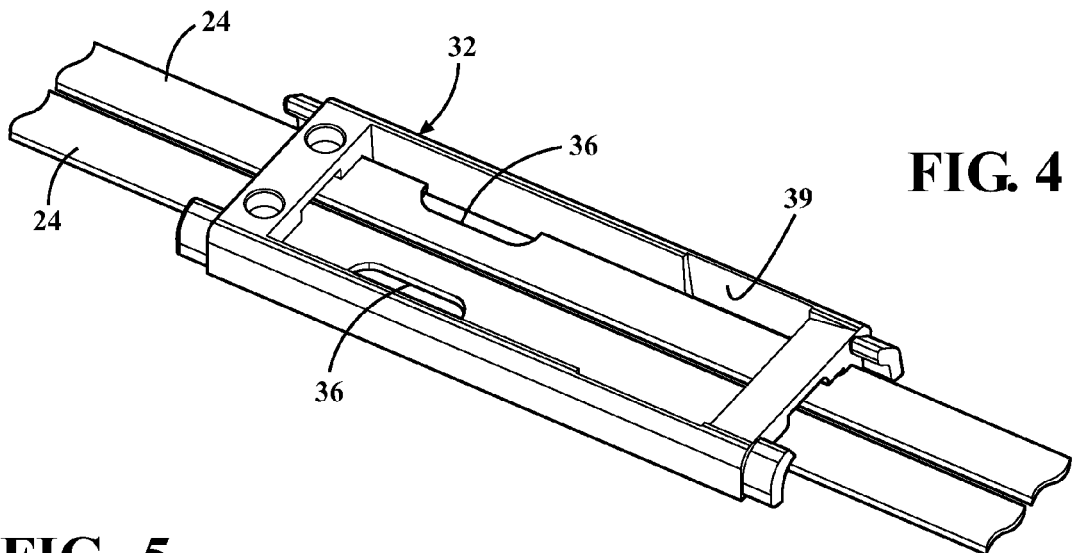
FIG. 4 is a fragmentary and perspective view showing a base coupled to the pair of carrier elements.
Figure 5:
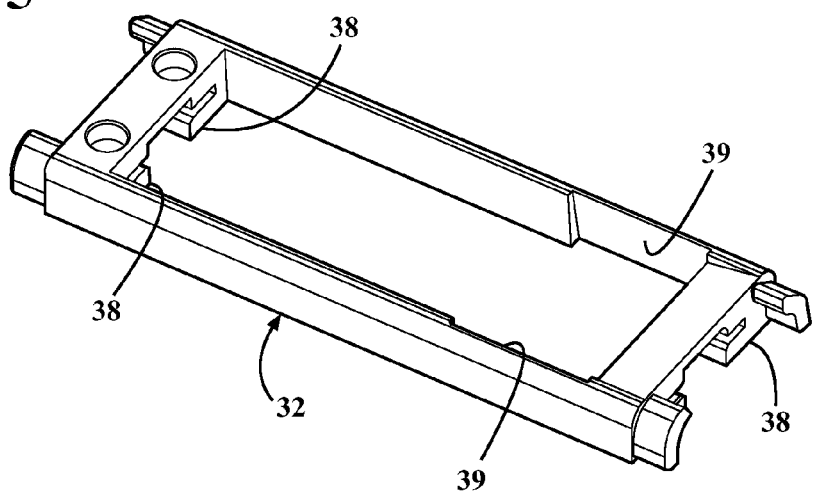
FIG. 5 is a perspective and elevation view of the base.

Referring now to FIG. 4, the carrier elements 24 have outwardly facing notches 36, and the base 32 is positioned on the carrier elements 24 with the notches 36 being visible through the opening, which is generally rectangularly shaped but could have any desirable enclosed or non-enclosed shape. As shown in FIG. 5, the base 32 includes four generally L-shaped legs 38 disposed at its four corners for engaging the carrier elements 24. The base 32 is slid from one end of the carrier elements 24 into the position shown in FIG. 4. Once in position, the base 32 is non-removably secured to the carrier elements 24, for example, through heat staking. However, it should be appreciated that the base 32 could alternately be non-removably secured to the carrier elements 24 through crimping, welding, adhesives, fasteners, etc. The sides of the base 32 present a pair of indentations 39, and small gaps are present between the carrier elements 24 and the base 32 at the indentations 39.

Figure 6:
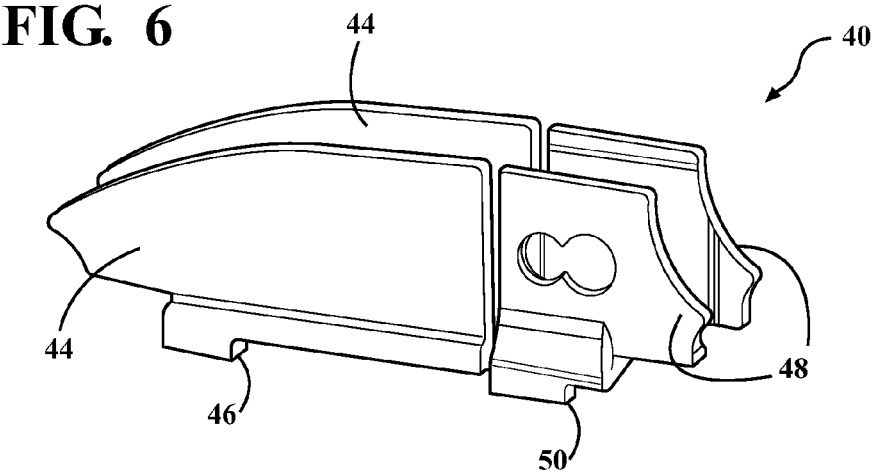
FIG. 6 is a perspective and elevation view of a connector body of the first connection device.
Figure 7:
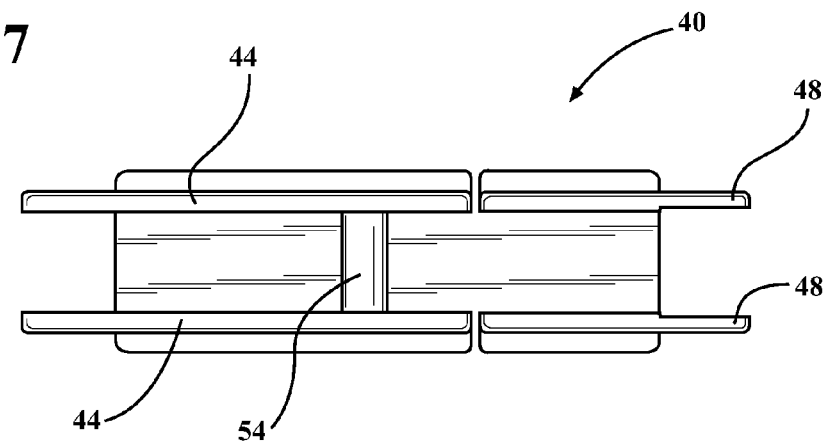
FIG. 7 is a top elevation view of the exemplary connector body.
Figure 8:
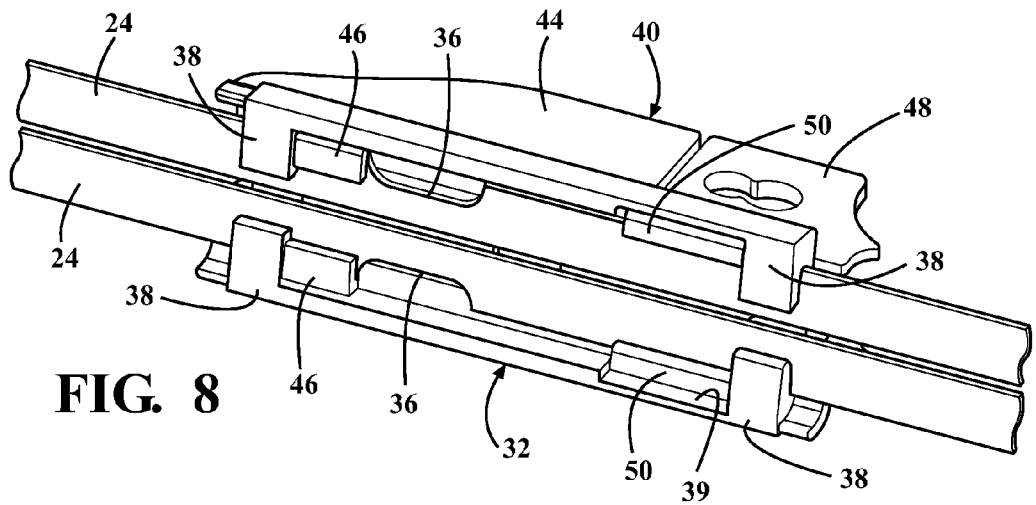
FIG. 8 is a perspective and fragmentary view of exemplary connector body in engagement with the pair of carrier elements.

Referring back to FIG. 2, the first exemplary connection device 34 includes a connector body 40 and an adapter 42. The connector body 40 is generally shown in FIG. 6 and includes a pair of front side walls 44, a pair of front holding elements 46, a pair of back side walls 48 and a pair of back holding elements 50 all integrally connected with one another through a bottom portion. The back side walls 48 are spaced from the front side walls 44 by a slot. This allows the back side walls 48 to be pinched together without influencing the front side walls 44. Pinching the back side walls 48 together also causes the back holding elements 50 to deflect outwardly. Referring now to FIG. 7, a cylindrical portion 54 extends between the front side walls 44. Referring now to FIG. 8, the front holding elements 46 are shaped and sized to be inserted through one of the notches 36 in the carrier elements 24.

The process of attaching the connector body 40 to the carrier elements 24 is very simple and may be undertaken without any special tools or other equipment. First, a person inserts the front holding elements 46 into the notches 36 of the carrier elements 24. Then, the person slides the connector body 40 in a forward direction until the front holding elements 46 abut the legs 38 of the base 32, i.e. the base 32 provides a physical indication that the connector body 40 is in the proper position. Next, the person pinches the back side walls 48 together to deflect the back holding elements 50 outwardly and pivots the connector body 40 downwardly until the back holding elements 50 slide through the gap between the indentations 39 of the base 32 and the carrier elements 24. The person then releases the back side walls 48, which causes the back holding elements 50 to snap inwardly and directly engage the bottom of the carrier elements 24, as best shown in FIG. 8. Because the connector body 40 is secured directly to the carrier elements 24 it may be formed to have a lower profile than other known removable connector bodies 40. This reduces the visibility of the connector body 40 from the interior of the vehicle, thereby improving a driver's visibility of the road.

Figure 9:
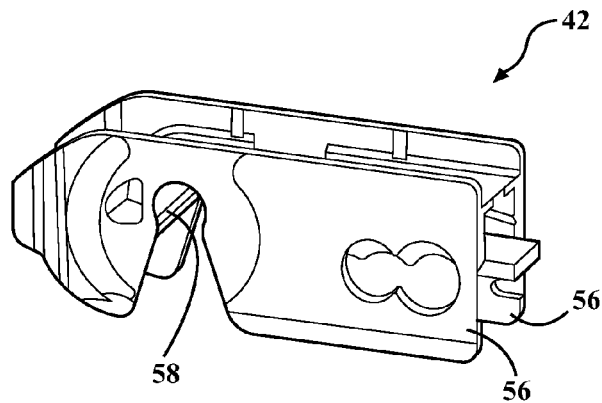
FIG. 9 is a perspective and elevation view of an adapter of the first connection device.

Once the connector body 40 is properly secured to the carrier elements 24, the user may attach the adapter 42 to the connector body 40. As shown in FIG. 9, the exemplary adapter 42 includes a pair of vertically extending adapter walls 56 and a semi-circular opening 58. To secure the adapter 42 with the connector body 40, the user simply snaps semi-circular opening 58 onto the cylindrical portion 54. This connection allows the adapter 42 to pivot about the cylindrical portion 54 of the connector body 40, thereby allowing the wiper blade assembly 20 to pivot relative to the hook-style wiper arm.

Referring back to FIG. 2, the distance between the adapter walls 56 is slightly less than the distance between the interior surfaces of the front and back side walls 44, 48 of the connector body 40, and the adapter 42 extends lengthwise in between the back side walls 48 of the connector body 40 when properly attached to the connector body 40. As such, when the adapter 42 is installed in the connector body 40, it functions as a stopper to restrict movement of the back side walls 48 of the connector body 40, thereby preventing the back holding elements 50 from flexing outwardly. This configuration is a safety feature which prevents accidental removal of the connector body 40 from the carrier elements 24.

To remove the connector body 40 from the carrier elements 24, the user simply removes the adapter 42 from the connector body 40, pinches the back side walls 48 together, pivots the connector upwardly until the back holding elements 50 clear the carrier elements 24 and slides the connector body 40 backwardly until the front holding elements 46 disengage from the carrier elements 24 through the notches 36. Similar to the installation process described above, removal of the connector body 40 from the carrier elements 24 requires no special tools or other equipment.

Figure 10:
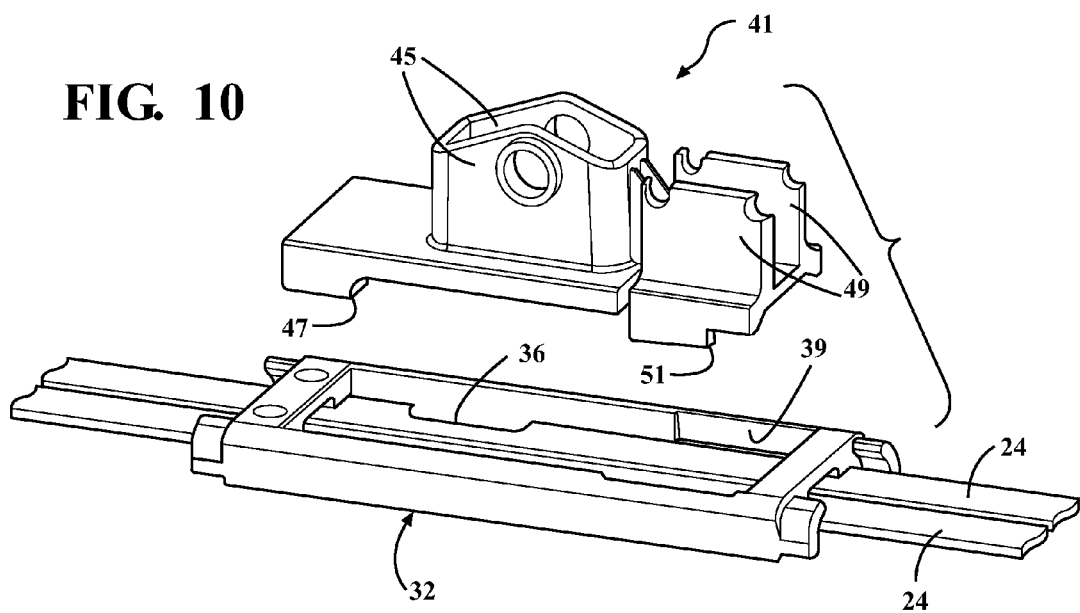
FIG. 10 is a fragmentary view of the pair of carrier elements and a connector body of the second connecting piece.
Figure 11:
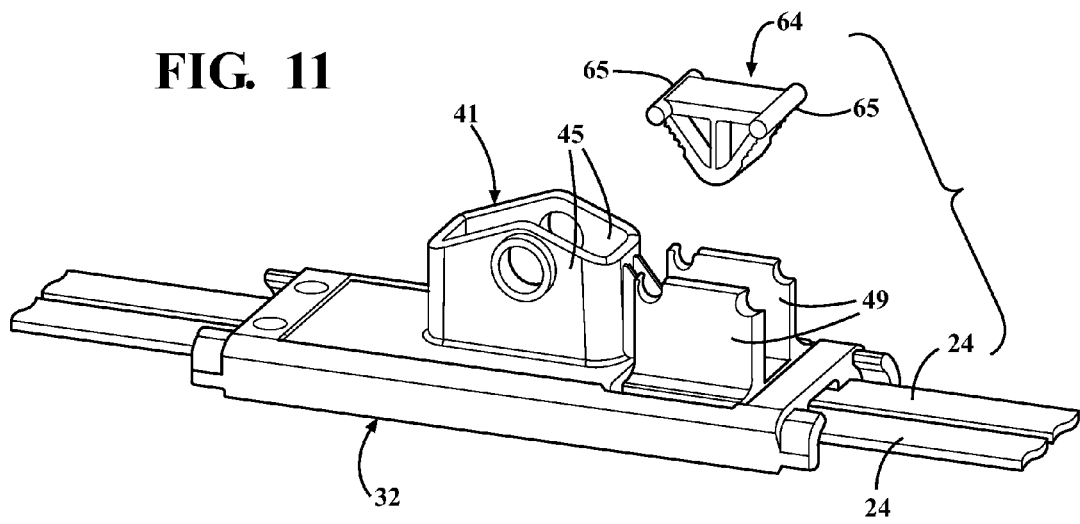
FIG. 11 is a fragmentary view of the second connector body of the second connecting piece secured with the pair of carrier elements and with a stopper piece.
Figure 12:
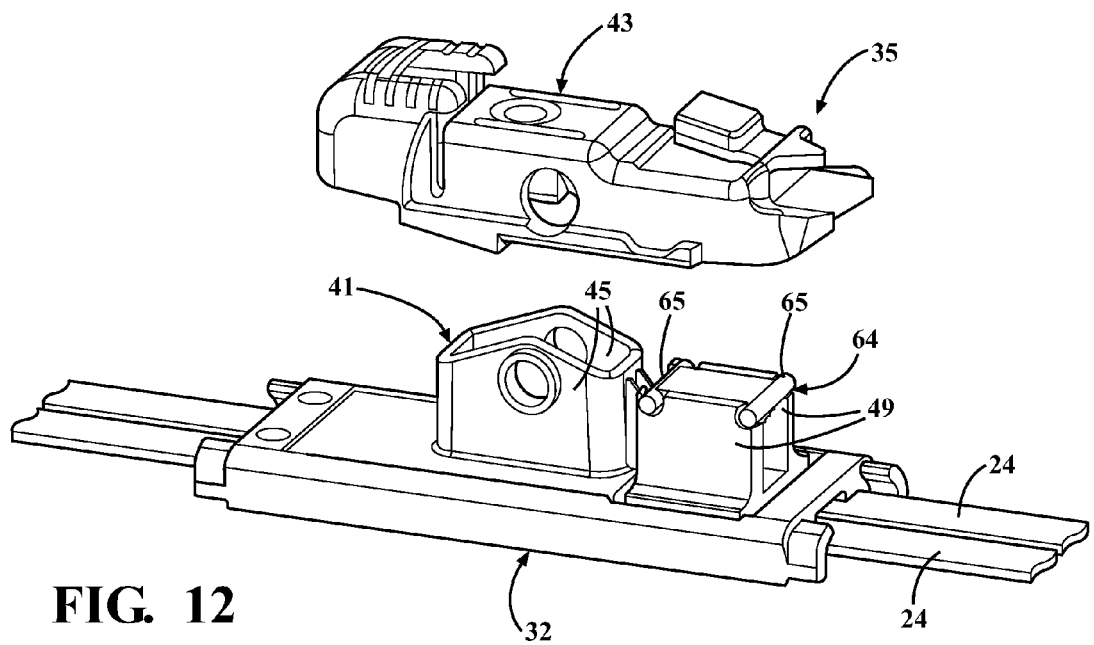
FIG. 12 is a fragmentary view of the second connector body secured with the pair of carrier elements and with an adapter.
Figure 13:
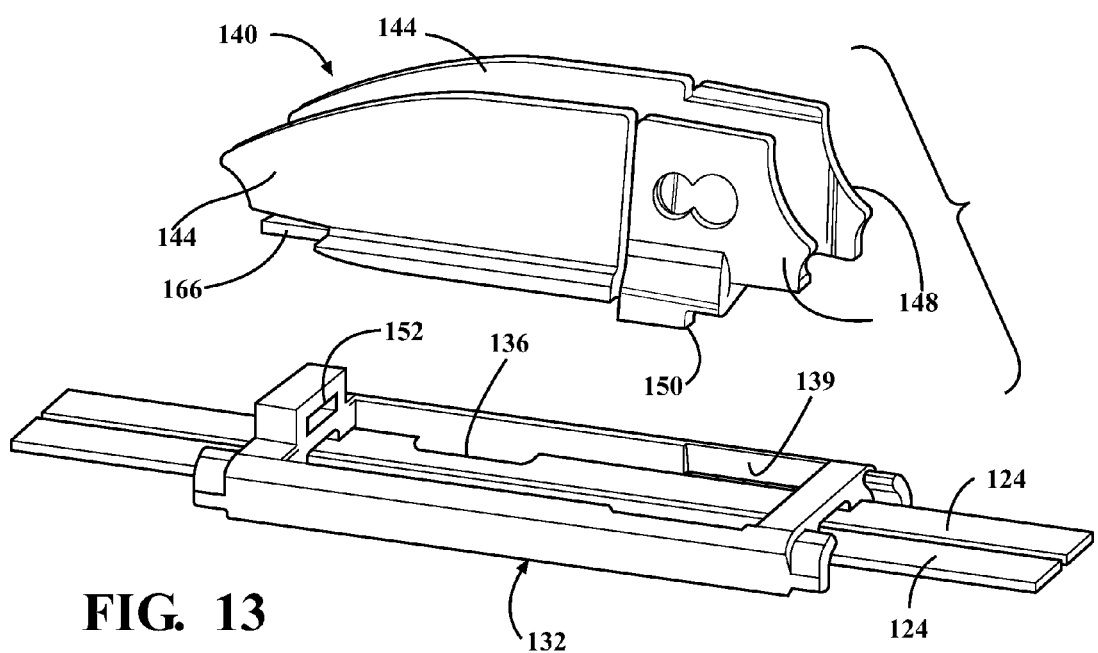
FIG. 13 is a perspective view of a carrier element and a connector body of second exemplary embodiment of the wiper blade assembly.

The connector body 41 of the second connection device 35 is shown in FIG. 10. Similar to the first exemplary connector body 40 described above, the second exemplary connector body 41 includes front holding elements 47, back holding elements 51, front side walls 45 and back side walls 49. Attachment of the connector body 41 to the notched carrier elements 24 follows the same process as described above in conjunction with the first exemplary connector body 40. As shown in FIG. 3, the adapter 43 of the second connection device 35 is disposed outwardly rather than inwardly of the back side walls 49 of the connector body 41. Accordingly, as shown in FIG. 12, the second connection device 35 includes an additional stopper piece 64 to prevent the back holding elements 50 from accidentally disengaging from the carrier elements 24. The stopper piece 64 includes two cylindrical rods 65 which extend outwardly for snapping into engagement with corresponding grooves in the back side walls 49 of the connector body 41. If the person wants to remove the connector body 41 from the carrier elements 24, he or she must first remove the stopper piece 64 from the connector body 41.

Figure 14:
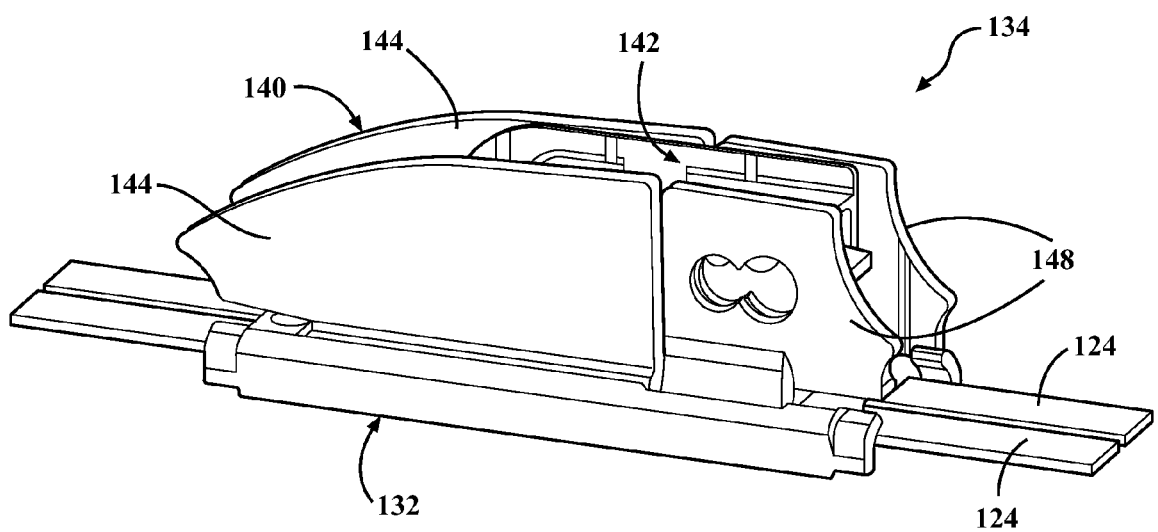
FIG. 14 is a perspective and fragmentary view of a connection device secured to the carrier elements of the second exemplary embodiment of the wiper blade assembly.

Referring now to FIG. 14, a connection device 134 of a second exemplary embodiment of the wiper blade assembly is generally shown with like numerals offset by a factor of 100 being used to indicate like features with the first exemplary embodiment. The connection device 134 of the second exemplary embodiment is distinguished from the first exemplary embodiment because the connector body 140 is removably secured directly to both the carrier elements 124 and to the base 132.

The base 132 is constructed similarly to the base 32 of the first exemplary embodiment of the wiper blade assembly 20 but also includes a slot 152 shaped to receive a tongue 166 extending from the front of the connector body 140. The connector body 140 is distinguished from the first exemplary connector body 140 of the first exemplary embodiment by the tongue 166 and also by the lack of front holding elements 146.

The connector body 140 of the connection device 134 of the second embodiment of the wiper blade assembly may also be attached to the carrier elements 124 very quickly and without any tools. First the tongue 166 of the connector body 140 is slid onto the slot 152 of the base 132. Next, the back side walls 148 of the connector body 140 are pinched together to flex the back holding elements 150 outwardly, and the connector body 140 is pivoted downwardly so that the back holding elements 150 are inserted into the gaps between the indentations 139 of the base 132 and the carrier elements 124. Then, when the back side walls 148 is released, the back holding elements 150 will snap inwardly and engage the bottom of the carrier elements 124.

To remove the connector body 140 from the carrier elements 124, the person simply pinches the back side walls 148 of the connector body 140 to deflect the back holding elements 150 outwardly and out of engagement with the carrier elements 124. Then, the user pivots the connector body 140 upwardly until the back holding elements 150 clear the carrier elements 124. Finally, the user slides the connector body 140 backwardly to disengage the tongue 166 from the slot 152. Like the installation process, removal of the connector body 140 from the carrier elements 124 requires no special tools or other equipment.

Another aspect of the present invention is related to a method of making a windscreen wiper device. The method includes the step of preparing a wiper strip 22 and at least one carrier element 24 in engagement with the wiper strip 22 to bias the wiper strip 22 into a predetermined configuration. Preferably, two carrier elements 24 are in engagement with the wiper strip 22. The method continues with engaging a base 32 having an opening with the carrier elements 24. The method then proceeds with the step of engaging a connection device 34 directly with the carrier elements 24 through the opening in the base 32.

In one exemplary embodiment of the method, the connection device 34 includes a connector body 40 with a pair of front holding elements 46 and a pair of back side walls 48 and the carrier elements 24 each have a notch 36. In this embodiment, the step of engaging the connection device 34 directly with the carrier elements 24 includes the steps of inserting a pair of front holding elements 46 through the notches 36 of the carrier elements 24 and sliding the connector body 40 in a longitudinal direction to engage the front holding elements 46 with the carrier elements 24. The engaging step also includes the step of pinching the back side walls 48 inwardly to deflect the back holding elements 50 outwardly, rocking the connector body 40 downwardly and deflecting the back holding elements 50 inwardly to engage around opposite sides of the carrier elements 24.

Another exemplary embodiment of the method further includes the step of engaging the connection device 34 with the base 32. This could be through, for example, a tongue 66 and slot 52 connection.

Obviously, many modifications and variations of the present invention are possible in light of the above teachings and may be practiced otherwise than as specifically described while within the scope of the appended claims.

What is claimed is:

1. A windscreen wiper device for cleaning a windshield of a vehicle, comprising:
a longitudinally extending wiper strip;
at least one carrier element in engagement with said wiper strip for operatively supporting and biasing said wiper strip into a predetermined configuration;
a base non-removably coupled to said at least one carrier element and having an opening extending therethrough to provide access to said at least one carrier element through said base;
a connection device, including a connector body, removably secured directly to said at least one carrier element through said opening of said base for attachment with a wiper arm; and
said carrier element including a pair of notches and said connector body including a pair of holding elements that are selectively moveable inwardly and outwardly between engaged positions for engaging with said carrier element to releasably lock said connector body with said carrier element and disengaged positions for disengaging from said carrier element to allow removal of said connector body from said carrier element.

2. The windscreen wiper device as set forth in claim 1 wherein an adapter is pivotably coupled to said connector body.

3. The windscreen wiper device as set forth in claim 2 wherein said connector body is coupled directly to both said base and said at least one carrier element.

4. The windscreen wiper device as set forth in claim 2 wherein said at least one carrier element is a pair of longitudinal strips.

5. The windscreen wiper device as set forth in claim 2 wherein said pair of holding elements are pivotable to selectively engage with and disengage from said at least one carrier element.

6. The windscreen wiper device as set forth in claim 5 further including a stopper engaged with said connector body between said rear walls to restrict pivoting of said holding elements.

7. The windscreen wiper device as set forth in claim 2 wherein one of said connector body and said base includes a tongue and the other includes a slot shaped to receive said tongue to interconnect said connector body with said base.

8. A windscreen wiper device for cleaning a windshield of a vehicle, comprising:
- a longitudinally extending wiper strip;
- at least one carrier element in engagement with said wiper strip for operatively supporting and biasing said wiper strip into a predetermined configuration;
- a base non-removably coupled to said at least one carrier element and having an opening extending therethrough to provide access to said at least one carrier element through said base;
- a connector body removably secured directly to said at least one carrier element through said opening of said base for attachment with a wiper arm;
- wherein said connector body includes a pair of holding elements that are pivotable to selectively engage with and disengage from said at least one carrier element; and
- wherein said connecting body includes a pair of rear walls integrally connected with and extending upwardly from said holding elements and wherein pinching of said rear walls together causes said holding elements to pivot outwardly.

* * * * *